G. A. ALLSOPP.
CULINARY UTENSIL.
APPLICATION FILED JULY 12, 1909.
961,474.
Patented June 14, 1910.
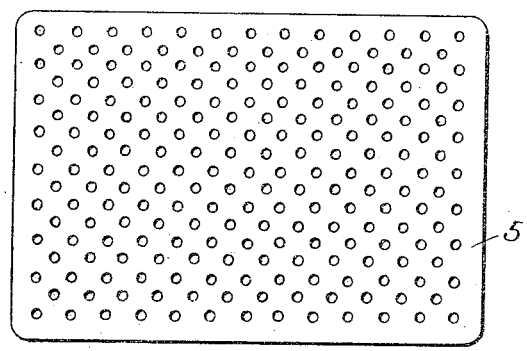
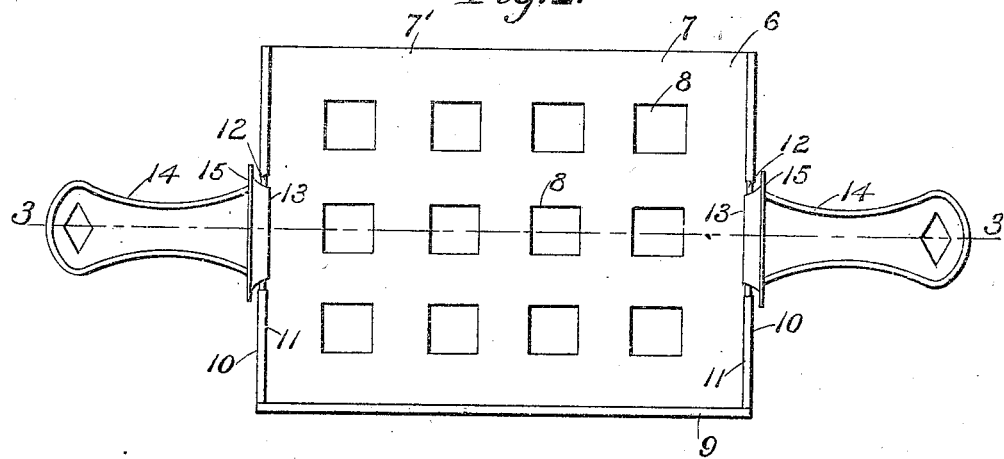
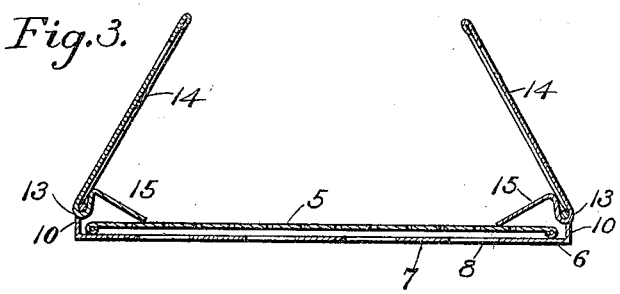
Witnesses.
H. C. Witt.
M. M. Harrington.
Inventor.
George Allen Allsopp
By Henry J. Miller
atty.

UNITED STATES PATENT OFFICE.

GEORGE ALLEN ALLSOPP, OF BROCKTON, MASSACHUSETTS.

CULINARY UTENSIL.

961,474.  Specification of Letters Patent.  Patented June 14, 1910.

Application filed July 12, 1909.  Serial No. 507,050.

*To all whom it may concern:*

Be it known that I, GEORGE ALLEN ALLSOPP, of Brockton, in the county of Plymouth, State of Massachusetts, have invented a new and useful Improvement in Culinary Utensils, of which the following is a specification, reference being had to the accompanying drawings, forming part thereof.

This invention has reference to improvements in culinary utensils and particularly to such utensils adapted to be utilized to immerse food in bodies of heated fluid cooking material.

The object of the invention is to so construct a culinary utensil that one element thereof is adapted to be passed through a machine whereby food material, in predetermined shape or shapes is delivered to such element and such element is thereafter combined with a supporting device so arranged that the whole may be immersed in hot lard or similar fluid material adapted to cook said food.

The invention consists in a culinary utensil comprising a perforated flat plate or element adapted to pass through a machine, and a supporting frame for said plate.

The invention also consists in such other novel features of construction and combination of parts as shall hereinafter be more fully described and pointed out in the claims.

Figure 1, represents a plan view of the food receiving plate. Fig. 2, represents a similar view of the plate supporting and holding frame. Fig. 3, represents a sectional view of the complete device taken on line 3—3 Fig. 2.

Similar numbers of reference designate corresponding parts throughout.

In the manufacture of doughnuts or similar small cakes, in large quantities the doughnuts are formed from dough by machinery and, preferably, should be fried or cooked without distorting the shapes in which they are formed by such machinery. To accomplish the removal of the doughnuts from the machine as rapidly as they are formed, without distorting the shapes of the doughnuts, and to support the same for the cooking operation is one of the principal objects of this invention.

As shown in the drawings 5 represents a foraminous flat plate or element which is adapted to be passed through the doughnut or cake forming machine without interfering with the operation of said machine.

6 represents the holding frame having the bottom 7, furnished with holes 8—8, the back 9, and the ends 10—10 having the bent over edges 11—11 adapted to hold in position the wires 12—12 on which the bent portions 13—13 of the handles 14—14 and blades 15—15 are pivoted.

In use, the flat plate or element 5, or a series of such plates, is passed through the machine which forms the doughnuts or cakes and deposits them on the said plate. As the plates 5 with their contents pass from the machine they can be stored for future cooking or they may be placed, successively in the frames 6 by sliding one of said plates over the open edge 7' of the bottom 7 of said frame, the handles 14—14 are now swung inward from the positions shown in Fig. 2 of the drawing, to the positions shown in Fig. 3 thereof, where the edges of the blades 15—15 bear against the plate 5 to hold the same in position. The handles 14—14 are now grasped by the hands of the operator and the utensil is immersed in hot lard or other suitable fluid cooking material contained in any ordinary vessel and to such depth as is necessary to subject the doughnuts or cakes to such cooking material, which is free to circulate through the foraminations of the plate 5.

After the cooking operation the utensil is raised from the cooking vessel, by means of the handles 14—14, and said handles are swung outward on their pivots to permit the plate 5 to slide out of the open side of the frame 6.

Having thus described my invention I claim as new and desire to secure by Letters patent—

1. The combination with a supporting frame having edges forming guides and a stop, and plate holding means pivotally mounted thereon of a foraminous plate adapted to be slidably mounted on said frame and to be engaged by said holding means.

2. The combination with a frame having openings in its bottom and upwardly extending ends, and handles pivotally mounted on said ends and having inwardly extending holding blades, of a flat foraminous plate adapted to be received between said ends as and for the purpose described.

GEORGE ALLEN ALLSOPP.

Witnesses:
FRANCIS J. GEOGAN,
HENRY J. MILLER.